(12) United States Patent
Cesano

(10) Patent No.: US 6,739,856 B2
(45) Date of Patent: May 25, 2004

(54) EQUIPMENT FOR HOT MOULDING OF ARTICLES MADE OF THERMOPLASTIC MATERIAL

(75) Inventor: Franco Cesano, San Secondo di Pinerolo (IT)

(73) Assignee: CRS Srl Centro Ricerche e, Turin (IT)

( * ) Notice: Subject to any disclaimer, the term of this patent is extended or adjusted under 35 U.S.C. 154(b) by 144 days.

(21) Appl. No.: 09/852,677

(22) Filed: May 10, 2001

(65) Prior Publication Data

US 2001/0040313 A1 Nov. 15, 2001

(30) Foreign Application Priority Data

May 12, 2000 (IT) ..................................... TO2000A0443

(51) Int. Cl.⁷ .............................................. B29C 45/16
(52) U.S. Cl. ....................... 425/112; 264/266; 264/294; 264/318; 425/127; 425/129.1; 425/416; 425/DIG. 58
(58) Field of Search ................................ 425/111, 112, 425/127, 129.1, DIG. 58, 577, 416; 264/266, 318, 294

(56) References Cited

U.S. PATENT DOCUMENTS

| | | | |
|---|---|---|---|
| 4,889,480 A | * 12/1989 | Nakamura et al. | 425/577 |
| 5,824,256 A | * 10/1998 | Ballester | 264/318 |
| 5,851,558 A | * 12/1998 | Atake | 425/111 |
| 5,895,621 A | * 4/1999 | Tajiri et al. | 264/318 |
| 6,116,891 A | * 9/2000 | Starkey | 425/556 |
| 6,126,429 A | * 10/2000 | Burger et al. | 425/DIG. 58 |

FOREIGN PATENT DOCUMENTS

| | | |
|---|---|---|
| DE | 19818881 | 11/1998 |
| FR | 2768360 | 3/1999 |
| JP | 59201835 | 11/1984 |
| JP | 04168019 | 6/1992 |
| JP | 08229977 | 9/1996 |
| JP | 0825838 | 10/1996 |
| JP | 11123725 | 5/1999 |
| WO | WO99/20450 | * 4/1999 |

* cited by examiner

Primary Examiner—Tim Heitbrink
(74) Attorney, Agent, or Firm—TraskBritt

(57) ABSTRACT

A process for the hot moulding of articles (L) made of thermoplastic material includes the steps of: heating at least one plate of thermoplastic material (L) to a plasticizing temperature; compressing the heated plate (L) between two moulding surfaces (14, 16), set opposite one another, of a pair of half-moulds (10, 12); and forming, by injection moulding, at least one component (22) anchored to a surface of the plate (L), while the plate is being compressed between the moulding surfaces (14, 16).

6 Claims, 3 Drawing Sheets

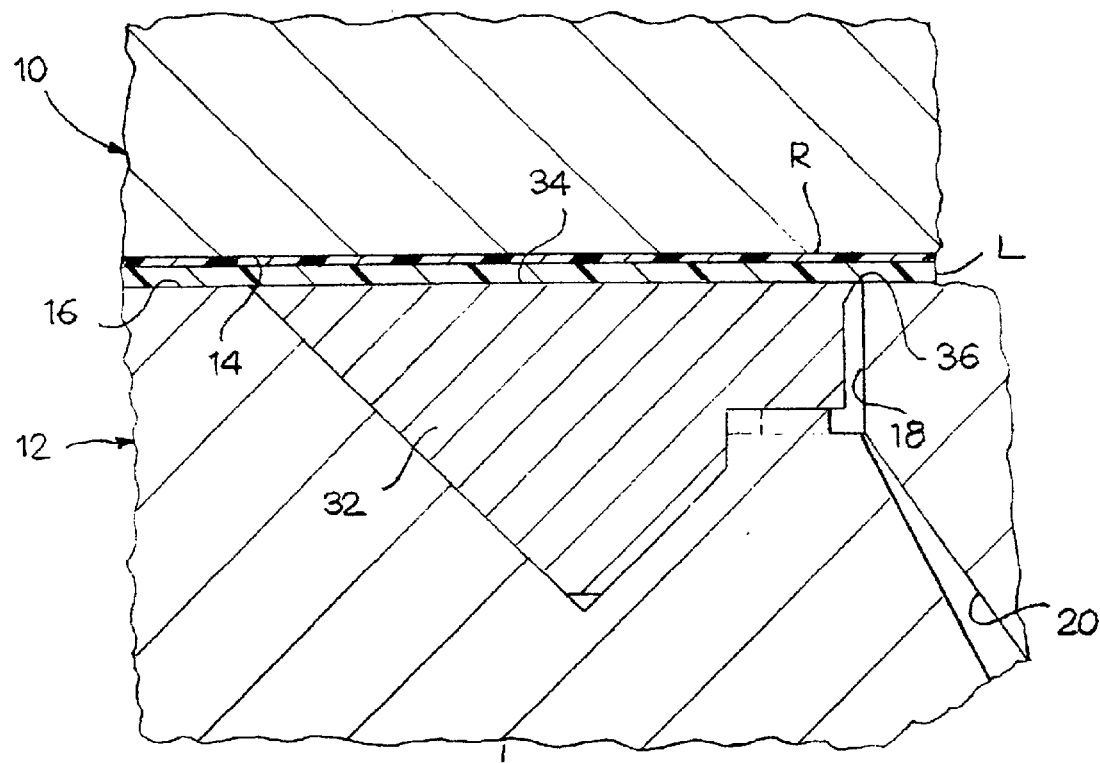
Fig_1
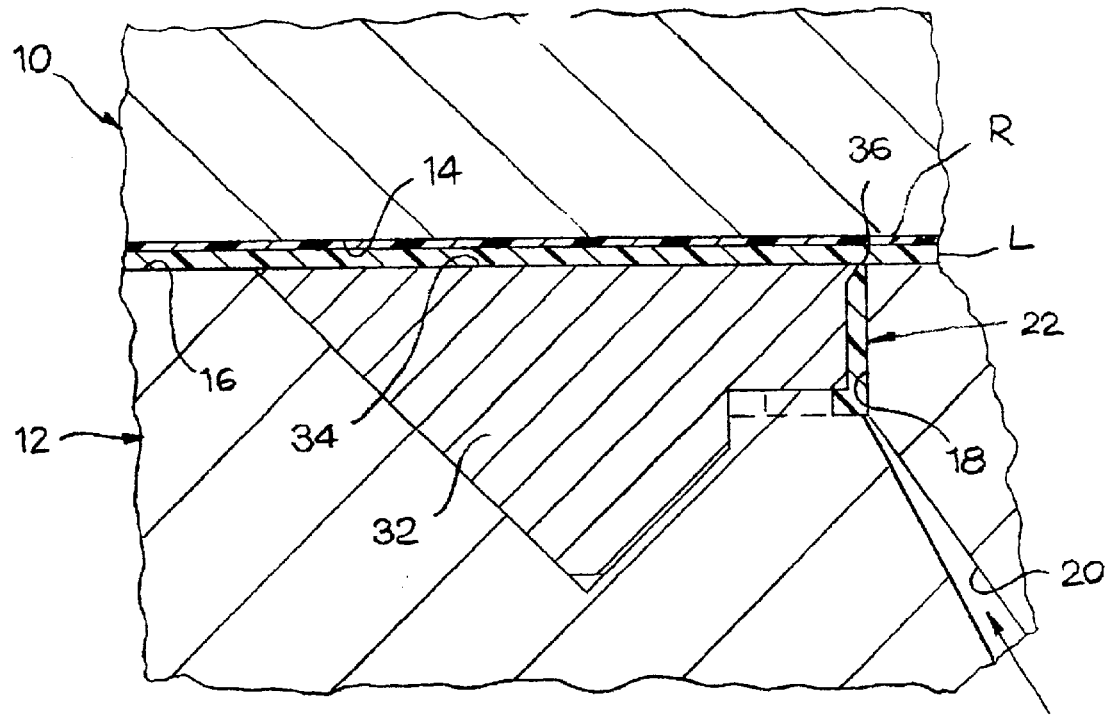
Fig_2

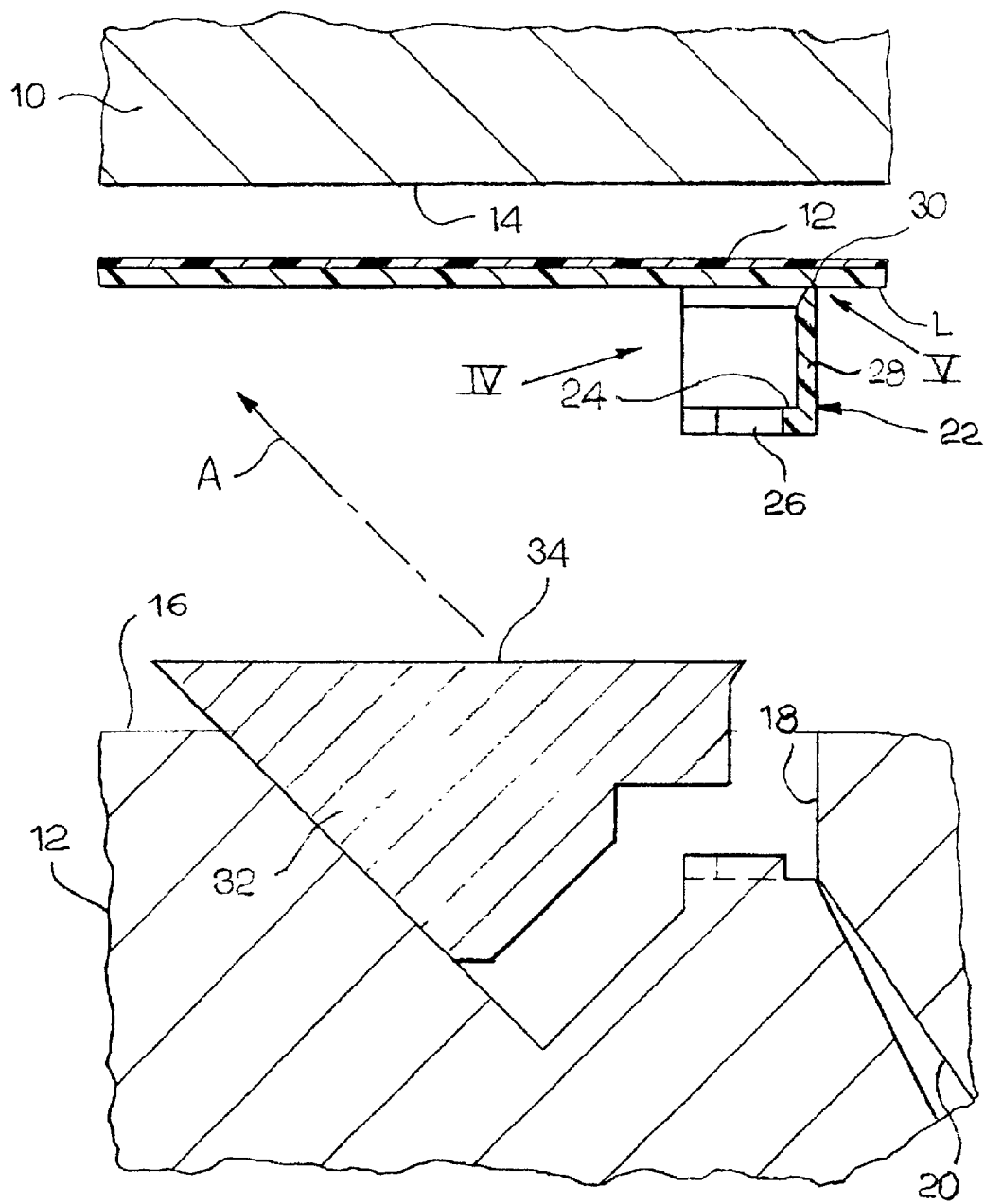
Fig_3

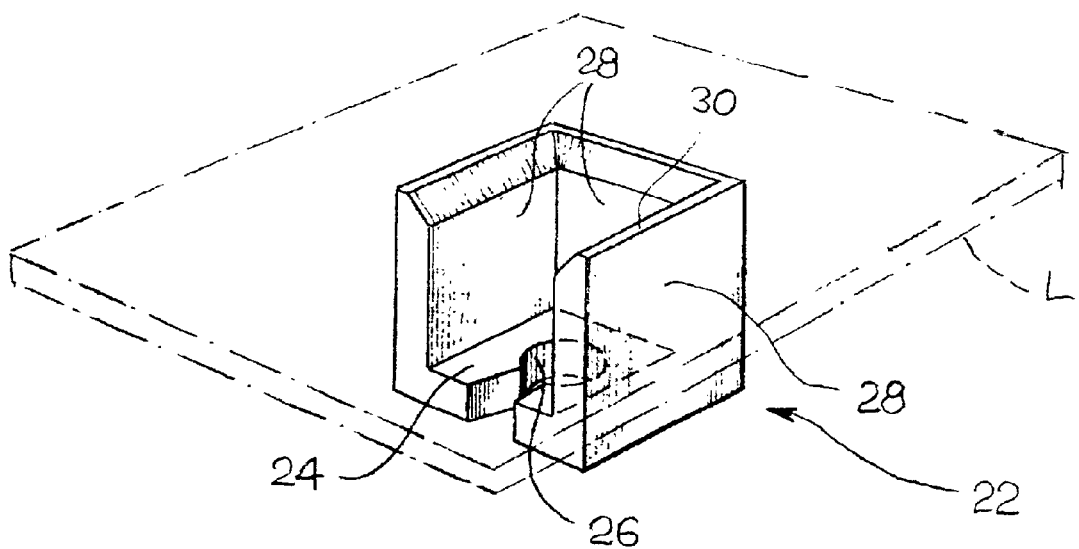
Fig_4
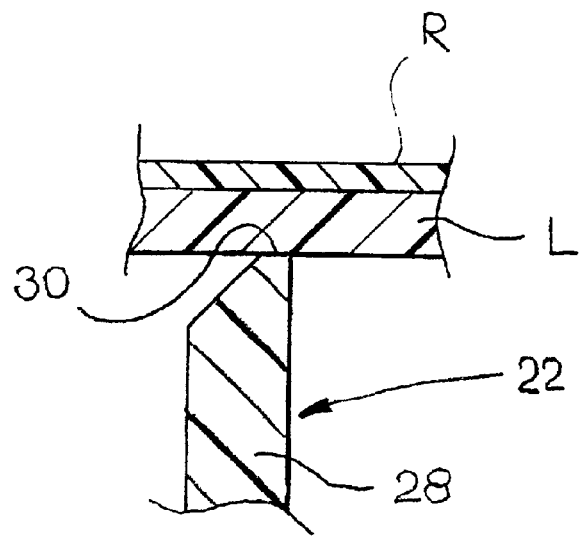
Fig_5

EQUIPMENT FOR HOT MOULDING OF ARTICLES MADE OF THERMOPLASTIC MATERIAL

BACKGROUND OF THE INVENTION

1. Field of the Invention

The present invention relates to a process and equipment for the hot moulding of articles made of thermoplastic material.

2. State of the Art

The invention has been developed in particular for the moulding of panels for lining the interiors of motor vehicles. A conventional technology for the production of lining panels involves heating of at least one plate of thermoplastic material to a plasticizing temperature and setting the plate, together with a possible upholstery sheet, between two half-moulds of an apparatus for hot moulding, which are provided with respective moulding surfaces set opposite one another. Hot moulding involves the application of pressure on opposite surfaces of the plate in a plastic state, thus bestowing on the plate the desired shape. Normally, during moulding of the plate, also an upholstery sheet is applied on one surface of the plate itself When panels are produced for internal lining of motor vehicles, it is often necessary to fix, on the rear surface of the panel, one or more inserts forming an anchoring seat for a fixing means, such as a screw a snap-in pin, or the like. Normally, these inserts are produced by injection moulding separately from the hot moulding of the panel, and are subsequently fixed by welding on the rear surface of the moulded plate. Alternatively, the inserts produced by injection moulding may be fixed on the plate during hot moulding of the plate itself. In this case, the inserts are positioned in the hot-moulding equipment and are mechanically anchored to the plate during moulding.

The latter approach requires injection-moulding equipment independent of the hot-moulding equipment and involves an operating step in which the inserts are fixed onto the moulded plates, or else a step in which the inserts are positioned on the moulding equipment.

SUMMARY OF THE INVENTION

The object of the present invention is to provide a process and equipment for hot moulding of articles made of thermoplastic material, which will enable a reduction in the cost of the finished articles and a simplification of the production cycle.

According to the present invention, the above subject is achieved by a process and equipment having the characteristics specified in the claims.

BRIEF DESCRIPTION OF THE SEVERAL VIEWS OF THE DRAWINGS

The present invention will now be described in detail with reference to the attached drawings, which are provided purely to furnish a non-limiting example, and in which:

FIG. 1 is a schematic partial section of hot-moulding equipment according to the present invention;

FIGS. 2 and 3 are schematic sections illustrating the equipment of FIG. 1 in various steps of the operating cycle;

FIG. 4 is a schematic perspective view of the part indicated by the arrow IV in FIG. 3; and FIG. 5 is a detail at an enlarged scale of the part indicated by the arrow V in FIG. 3.

DETAILED DESCRIPTION OF THE INVENTION

With reference to FIGS. 1–3, the numbers 10 and 12 respectively designate a top half-mould and a bottom half-mould of a hot-moulding apparatus. The half-moulds 10, 12 have respective moulding surfaces 14, 16, which are set opposite each other and are designed to apply a moulding pressure on a plate L of thermoplastic material, following upon movement from an open position to a closed position.

FIG. 1 illustrates the half-moulds in a closed position, at the end of hot moulding of the plate L. The plate L is first heated up to a plasticizing temperature and is set between the two half-moulds 10, 12 while these are in the open position. An upholstery sheet R may be set between the two half-moulds together with the plate L so that it will be applied on one surface of the plate L during moulding of the latter. The half-moulds 10, 12 are provided, in a conventional way, with a cooling system in order to ensure that, during the moulding operation, the plate L will be cooled down to a temperature substantially lower than the plasticizing temperature of the thermoplastic material.

One of the two half-moulds (in the example illustrated, the bottom half-mould 12) is provided with at least one injection-moulding seat 18, which communicates with an injection channel 20. The seat 18 is designed to form an insert 22 having, for instance, the shape illustrated in FIG. 4. The insert 22, illustrated to provide an example in FIG. 4, comprises a portion 24 containing a hole 26 with its axis substantially orthogonal to the plate L. The portion 24 is connected to the plate $L_3$ via three walls 28 fixed to the plate L, each along one of its edges 30.

FIG. 1 illustrates the configuration of the moulding equipment at the end of the hot-moulding step and before injection of plastic material into the injection-moulding seat 18. The seat 18 is defined between one portion of the mould 12 and a slider 32 which is mobile with respect to the half-mould 12 to enable extraction of the insert 22 that is formed in the seat 18. The slider 32 has a surface 34 which constitutes a portion of the hot-moulding surface of the half-mould 12.

As may be seen in FIG. 1, the moulding seat 18 communicates with the hot-moulding surface 16, 34 by means of a narrow section 36 which constitutes the joining edge 30 between the insert 22 and the plate L. The narrow section 36 has a surface substantially smaller than that of the transverse section of the remaining part of the cavity 18, so as to produce, at the narrow section 36, a marked reduction in the pressure of the plastic material injected into the moulding seat 18.

With reference to FIG. 2, after hot moulding of the plate L has been completed, and after partial cooling of the plate L by contact with the half-moulds 10, 12, plastic material compatible with the thermoplastic matrix of the plate L is injected into the injection-moulding seat 18. The injection of plastic material is performed according to a technology typical of injection moulding of plastic materials. For example, the plastic material may be propylene-based and may be injected at pressures in the region of 600–1000 bar and at a temperature in the region of 180° C. The narrow section 36 of contact between the moulding seat 18 and the plate L reduces the pressure against the plate L of the injected material and thus prevents the injected material from damaging the plate L and the upholstery sheet R. The dimensions of the narrow section 36 can be varied according to the parameters of the injection process so as to prevent damage to the plate and, at the same time, to obtain a surface for mutual fixing between the insert 22 and the plate L that is sufficiently large for providing firm anchorage.

As Illustrated in FIG. 3, after the insert 22 has been obtained by injection moulding, the half-moulds 10, 12 are brought into the open position and, at the same time, the slider 32 is displaced with respect to the half-mould 12 in the direction indicated by the arrow A so as to enable extraction of the insert 22 from the seat 18. As illustrated in FIGS. 3 and 5, the insert 22 is anchored to the plate L along the edge 30 having a narrow section. The number of insert 22 fixed to the plate L may vary according to the particular requirements. Also the shape and size of each insert 22 may vary widely with respect to what is described and illustrated herein purely for the purpose of providing an example.

What is claimed is:

1. Equipment for hot moulding of articles made of thermoplastic material, comprising:
    a first half-mould and a second half-mould which are movable with respect to one another between an open position and a closed position and are provided with respective compression moulding surfaces designed to apply a moulding pressure on at least one plate of thermoplastic material, following upon movement from the open position to the closed position,
    at least one injection-moulding seat in at least one of said half moulds, the injection-moulding seat communicating with the respective moulding surface,
    at least one injection channel provided for injection plastic material inside said injection-moulding seat,
    at least one narrow section between the injection-moulding seat and the respective moulding surface designed to reduce the pressure of the plastic material injected in the injection-moulding seat in contact with said plate.

2. Equipment according to claim 1, wherein said at least one narrow section is provided at a location where the injection-moulding seat communicates with the respective compression moulding surface.

3. Equipment according to claim 1, comprising a slider movable with respect to the respective half-mould, the slider having at least one injection moulding surface forming at least one wall of said injection-moulding seat.

4. Equipment according to claim 3, wherein said narrow section is provided between said slider and said half-mould.

5. Equipment according to claim 3, wherein the slider has a compression moulding surface forming a portion of the compression moulding surface of the respective half-mould.

6. Equipment according to claim 4, wherein said narrow section is provided at a location in which the compression moulding surface of the slider communicates with the injection moulding seat.

* * * * *